United States Patent [19]

Johnson, Jr.

[11] 4,025,207
[45] May 24, 1977

[54] POSITIVE LOCKING TURNBUCKLE

[75] Inventor: Curtiss S. Johnson, Jr., Middle Haddam, Conn.

[73] Assignee: C. Sherman Johnson Company, Inc., East Haddam, Conn.

[22] Filed: Sept. 15, 1975

[21] Appl. No.: 613,107

[52] U.S. Cl. .................................. 403/46; 403/103
[51] Int. Cl.² ........................................ F16B 7/06
[58] Field of Search ................. 403/43, 44, 45, 46, 403/19, 20, 103

[56] References Cited

UNITED STATES PATENTS

| 2,482,883 | 9/1949 | Thomas | 403/220 X |
| 2,694,586 | 11/1954 | Smith | 403/46 |
| 3,081,116 | 3/1963 | Weiner et al. | 403/46 X |

FOREIGN PATENTS OR APPLICATIONS

| 415,460 | 7/1910 | France | 403/44 |
| 223,238 | 12/1925 | United Kingdom | 403/46 |

Primary Examiner—Wayne L. Shedd
Attorney, Agent, or Firm—McCormick, Paulding & Huber

[57] ABSTRACT

A positive locking turnbuckle has a generally cylindrical barrel with an internally threaded bore at each axial end in which terminal members are threadably received. Rotation of the barrel relative to the terminal members permits the overall length of the buckle and any attaching objects to be adjusted in conventional fashion. The barrel has a slot extending longitudinally between the ends and penetrating through the wall of the barrel into the respective bores. Each terminal member has a transverse channel or crosshole which can be rotated into a position registering with the slot in the barrel. Two coil springs are resiliently mounted on the outer surface of the barrel and each spring has a tang which projects through the slot of the barrel into the channel of a respective terminal member to prevent relative rotation of the barrel and terminal members and, thus, lock the turnbuckle in a selected adjustment condition. To adjust the turnbuckle, the tangs are temporarily withdrawn from the crossholes so that relative rotation of the terminal members and the barrel is permitted. During adjustment the coil springs remain captured on the barrel and after adjustment, the tangs are re-inserted into the crossholes of the terminal members.

7 Claims, 5 Drawing Figures

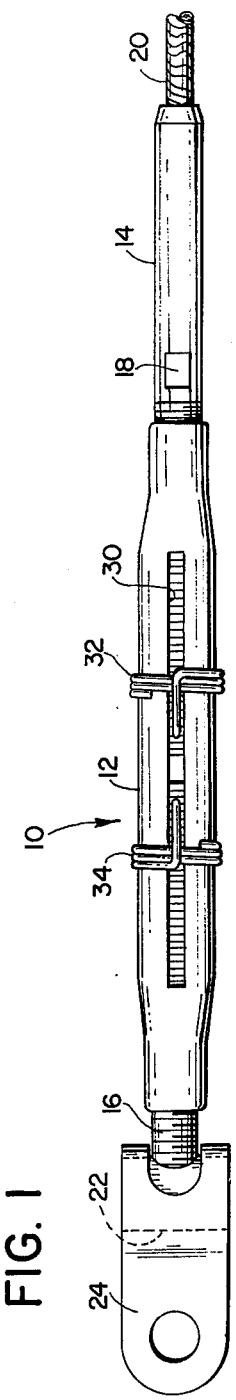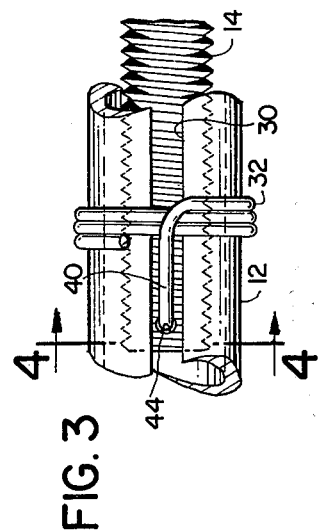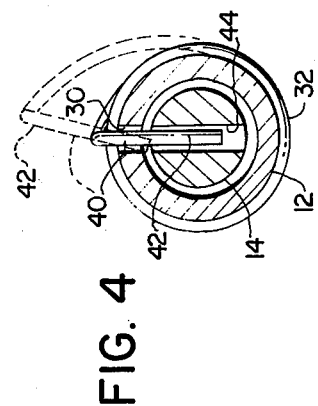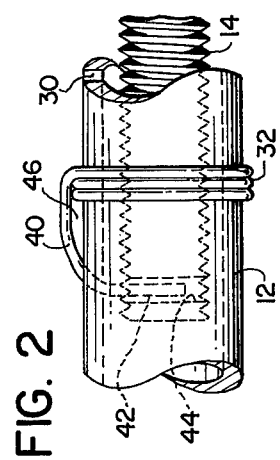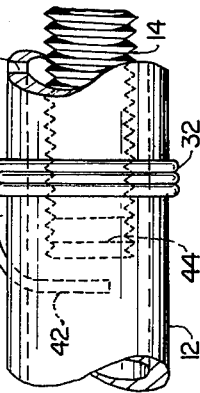

POSITIVE LOCKING TURNBUCKLE

BACKGROUND OF THE INVENTION

The present invention relates to a positive locking turnbuckle which can be adjusted with relative ease to various lengths in the same manner as a conventional turnbuckle and which may be positively locked at any one of a number of adjustments by a captured locking mechanism.

Turnbuckles are used on marine and other equipment as a connector between cables and similar objects or between dissimilar objects such as the stays and hull of a boat. The turnbuckles have an adjustable length which permits the interconnected objects to be held together by the turnbuckle with a preselected separation or with a predetermined tension. Turnbuckles are used in many different fields because by being adjustable, they accommodate a broad range of tolerances, and they permit objects to be initially interconnected in a loose fashion and subsequently placed in tension.

Because a conventional trunbuckle is fundamentally locked in a predetermined adjustment only by means of the friction between threaded parts, there is always the possibility of the adjustment being lost which, in itself, may be undesirable and which in some circumstances could produce a dangerous or unsafe condition. To avoid such results, some prior art turnbuckles have been provided with locking mechanisms to prevent inadvertent loss of a previously established adjustment and a resulting unsafe condition. U.S. Pat. Nos. 2,694,586 and 3,081,116 are representative of two such patents. In the more recent patent, the terminal members are locked with the barrel of the turnbuckle by means of cotter pins. In the earlier patent, a specially formed resilient sleeve or spring is mounted on the barrel and includes locking flanges which project through a slot in the barrel and engage a corresponding slot in the terminal member at each end of the barrel. In these two patents, changes in adjustment are executed either by removing the cotter pins or withdrawing the locking flanges and rotating the barrel and terminal members relative to one another.

It is a general object of the present invention to provide a turnbuckle having positive locking features such as disclosed in the cited prior art patents and which at the same time is easy to operate, and is comprised of relatively standard parts and in which the locking mechanism remains attached to the turnbuckle at all times so that the mechanism will not be readily lost when the turnbuckle is adjusted.

SUMMARY OF THE INVENTION

The present invention resides in a positive locking turnbuckle on which the locking mechanism is captured at all times. The turnbuckle is conventional to the extent that it has a barrel having a threaded internal bore at one end and a terminal member threadably engaged with the barrel in the bore whereby rotation of the member relative to the barrel produces an axial adjustment.

In accordance with the present invention, the barrel is provided with a longitudinally extending slot which penetrates through the wall of the barrel into at least one portion of the internally threaded bore, and the corresponding terminal member within the bore is provided with a radial or transversely extending channel that registers with the slot with each half revolution of the terminal member. An annular spring completely circumscribing the barrel is mounted coaxially on the outer surface of the barrel and is provided with a resilient tang which projects through the slot of the barrel and into the transverse channel of the terminal member to prevent relative rotation and thus lock the barrel and terminal member together. When the turnbuckle is to be adjusted the resilient tang is withdrawn from the transverse channel without removing the annular spring from the barrel, and the barrel and terminal member can then be rotated relative to one another. After an adjustment had been made, the transverse channel and the slots are placed in registration with one another and the spring is slid axially over the barrel to permit the tang to again be inserted through the slot into the channel and thus positively lock the turnbuckle at the selected adjustment.

When the annular spring is a coil spring mounted on the barrel with the locking tang formed by one end of the spring, the turnbuckle is comprised of conventional components but remains simple to operate and intact at all times even when the tang is removed from the locking engagement with the barrel and terminal member. The resiliency of the spring permits the tang to be removed and inserted numerous times without bending fatique which results in fracture of cotter pins of the prior art after only a few unlocking operations.

BRIEF DESCRIPTION OF THE DRAWINGS

FIG. 1 is an assembly view of the turnbuckle of the present invention shown connected with a clevis at one end and a stay or other cable at the opposite end.

FIG. 2 is an enlarged fragmentary view of the turnbuckle showing the locking mechanism in a side elevation.

FIG. 3 is an enlarged fragmentary view of the turnbuckle showing the locking mechanism in a plan view.

FIG. 4 is a sectional view of the turnbuckle along the sectioning line 4—4 in FIG. 3. FIG. 5 is an enlarged fragmentary view of the trunbuckle showing the locking mechanism during adjustment.

DESCRIPTION OF THE PREFERRED EMBODIMENT

In accordance with the present invention, FIG. 1 shows the positive locking turnbuckle, generally designated 10, in one form. Like conventional turnbuckles, the turnbuckle 10 includes a generally cylindrical barrel 12 having an internally threaded bore and two terminal members 14 and 16 threadably engaged with the barrel in the bore at the respective ends of the barrel. The terminal member 14 has a flat 18 located midway between the one end which is threaded and engaged with the barrel and the opposite end in which a cable or stay 20 is waged. The flat 18 permits the terminal member 14 to be held in a wrench while the barrel 12 is rotated relative to the member 14 to thereby adjust the length of the turnbuckle.

The terminal member 16 has an inner end threadably engaged with the barrel in the bore at the end of the barrel opposite the member 14, and an outer end bearing a pintle pin 22 connecting with a clevis 24. One of the terminal members 14 or 16 has a right-hand screw thread while the other of the member has a left-hand screw thread so that the rotation of the barrel when the terminal members are held stationary causes the overall length of the turnbuckle to be increased or decreased depending upon the direction of rotation.

In accordance with the present invention, the barrel 12 is provided with a slot 30 extending longitudinally along one side of the barrel and penetrating from the outer, generally cylindrical surface of the barrel into at least a portion of the bore at each of the barrel ends in which the terminal members 14 and 16 are threaded. While the barrel 12 is illustrated with one continuous bore from end to end and a single slot common to each end and intersecting that bore, it is also contemplated that separate bores in each end and separate slots intersecting the respective bores may be provided if desired. For example, if the barrel 12 was not provided with a generally cylindrical surface along its entire length but instead had a square or hexagonal configuration at its midpoint for engagement with a wrench, it would be preferable to provide separate bores and slots at each end of the barrel.

Mounted coaxially on the outer cylindrical surface of the barrel 12 are two annular coil springs 32 and 34 which completely circumscribe the barrel. The annular springs serve as locking mechanisms for the turnbuckle and are preferably of a diameter substantially equal to that of the cylindrical barrel portion on which they are mounted so that they slide axially along the barrel with ease. Each of the coil springs 32 and 34 has the same construction and functions in the same fashion with the respective terminal members 14 or 16 and the barrel 12 to positively lock the turnbuckle 10 at a predeterminded adjustment. The coil spring 32 and terminal member 14 are described in detail below, but it will be understood that the description is equally applicable to the coil spring 34 and terminal member 16.

FIGS. 2-4 illustrate the detailed construction of the barrel, the terminal end 14 and the coil spring 32 which permit the turnbuckle 10 to be positively locked and unlocked for adjustment. The coil spring 32 is provided with several coils which resiliently and snuggly engage the smooth outer cylindrical surface of the barrel 12 which surface is at least coextensive with the portion of the slot 30 penetrating into the barrel bore. One end of the spring is extended and bent over the other coils to form a tang 40 having an end portion 42 which projects radially through the slot 30 of the barrel 12 and into a transverse channel or crosshole 44 at the inner end of the threaded terminal member in which the end portion 42 terminates. When the radially extending end portion 42 is inserted into the terminal member 14, the barrel 12 and the terminal member cannot rotate relative to one another and thus these turnbuckle members are locked together. A similar effect is produced by the coil spring 34 on the opposite end of the barrel to lock the turnbuckle in a preselected adjustment.

It will be noted most clearly in FIG. 2 that the tang 40 is bent in a generally arcuate configuration and thus defines an open space 46 at one end of the spring between the outer wall of the barrel and the tang. When it is desired to adjust the turnbuckle 10, a screwdriver or other instrument is inserted through the space 46 between the tang 40 and the barrel 12, and the end portion 42 of the tang is lifted and removed from the crosshole 44 as shown in phantom in FIG. 4 to allow the barrel and terminal member to be rotated relative to one another and thereby adjust the axial length of the turnbuckle. When a predetermined adjustment has been obtained, the crosshole 44 in the terminal end 14 is rotated into registration with the slot 30 of the barrel, and the end portion 42 of the tang is again inserted into its locking position.

It will be understood that normally the barrel 12 is rotated relative to the stationary terminal ends and thus both of the tangs on the springs 32 and 34 are removed from the crossholes and terminal members before an adjustment is made. Furthermore, since the terminal members shift axially within the bore of the barrel 12, the coil springs 32 and 34 must also slide axially over the outer surface of the barrel to permit the tangs to be inserted into the crossholes. During adjustment the coil spring may be moved to the position shown in FIG. 5 in which the tang 40 extends into the slot 30 near the threaded end of the terminal member 14. In this position the tang in the slot insures that the spring cannot slip off of the barrel 12 and become lost.

It will be noted that the turnbuckle 10 possesses several important safety features. When the tangs of the coil springs 32 and 34 are inserted through the crossholes and the terminal members, the adjustment of the turnbuckle cannot be varied. When the tangs are removed from the crossholes, the annular springs remain captured on the barrel and thus cannot be lost. Since the tangs are only inserted through the wall of the barrel at one side, only one slot need be cut in the barrel and thus the barrel is not significantly weakened. Also, since the end portion 42 of the tang terminates within the barrel and terminal member in the locked condition of the turnbuckle, there are no sharp projections or protrusions which can catch or tear personnel or articles such as sails which come in contact with the turnbuckle. In effect, the smooth outer contour of a conventional turnbuckle is substantially preserved in the positive locking turnbuckle of the present invention. All of these safety features are obtained by the use of standard components which are readily available, and thus the features are not achieved at great expense.

While the present invention has been described in a preferred embodiment, it should be understood that numerous modifications and substitutions can be had without departing from the spirit of the invention. For example, although the terminal members are shown connected respectively to a pintle and cable, it will be understood that other objects interconnected by the turnbuckle may be connected directly or indirectly with the terminal ends. The outer surface of the barrel is preferably smooth and cylindrical along the portion on which the annular springs 32 and 34 are captured; however, other portions of the barrel may be knurled or have other configurations to facilitate its rotation and adjustment of the turnbuckle. While it is not essential, other slots may be provided at angularly displaced locations about the barrel or additional crossholes may be made in the terminal members if very fine adjustments of the turnbuckle are desired. Thus, the present invention has been described in a preferred embodiment by way of illustration rather than limitation.

I claim:
1. A positive locking turnbuckle comprising:
a generally cylindrical barrel member having an internally threaded bore at one end and defining a slot extending longitudinally along the member coextensive with at least a portion of the bore and penetrating from the outer surface of the member radially through the wall of the member to the bore;
an elongated terminal member having one end adapted for coupling to another object and an opposite threaded end threadably engaged with said one end of the barrel member within the bore whereby rotation of one member relative to the other member produces an axial adjustment of the members, the threaded end of the terminal member also having a crosshole which periodically registers with the slot in the outer member as the members are rotated relative to one another; and an annular coil spring having a plurality of coils completely circumscribing and snuggly engaging the barrel member and having a resilient locking tang formed by an extension of the spring coils at one end of the spring and bent transversely of the axis of the coils to project through the slot of the barrel member and into the crosshole of the terminal member for preventing relative rotations of the member and thereby locking the members together.

2. A positive locking turnbuckle as defined in claim 1 wherein:
the outer surface of the barrel member is smooth along one portion thereof coextensive with the longitudinally extending slot; and
the coil spring is mounted on the smooth portion of the outer surface coaxially of the barrel whereby the spring may be slid axially over the outer surface of the barrel member to register the tang with the crosshole in the terminal member at various adjustments.

3. A positive locking turnbuckle as defined in claim 1 wherein the tang formed by one end of the coil spring extends from said one end of the spring over the coils and beyond the opposite end of the spring and has a tip which projects radially inward of the coils through the slot of the barrel member and the crosshole of the terminal member whereby a space is provided between the outer surface of the barrel member and the tang for inserting an instrument to lift the tip radially out of the slot and crosshole.

4. A positive locking turnbuckle as defined in claim 1 wherein:
the barrel member has an internally threaded bore at each axial end and a longitudinally extending slot coextensive with at least a portion of each bore and penetrating through the wall of the barrel member into each bore;
two elongated terminal members having transverse crossholes are threadably engaged respectively with the two axial ends of the barrel member within the respective bores whereby the length of the turnbuckle is adjusted by rotating the barrel member relative to the two terminal members; and
two annular coil springs are snuggly mounted on the barrel member and have resilient tangs projecting respectively through the slots at the ends of the barrel member into the crossholes of the respective terminal ends to lock all of the members together.

5. A positive locking turnbuckle as defined in claim 4 wherein the slot in the barrel member at each end is a single slot extending longitudinally along the barrel member between each end of the member.

6. A positive locking turnbuckle as defined in claim 4 wherein the annular coil springs have tangs formed at one end of the coils and the tang of each spring is bent in a configuration defining an open space between the outer surface of the barrel member and the tang to facilitate the insertion of an instrument for removing the resilient tang from the crosshole and slot.

7. A positive locking turnbuckle as defined in claim 1 wherein:
the crosshole in the threaded end of the terminal member is a transverse hole extending completely through the terminal member.

* * * * *